(12) United States Patent
Kuboki et al.

(10) Patent No.: US 9,098,235 B2
(45) Date of Patent: Aug. 4, 2015

(54) VOICE COMMUNICATION ARRANGEMENT FOR MINIMIZING COMMUNICATION DELAY CAUSED BY AUDIO SIGNAL PROCESSING IN OS

(75) Inventors: Hiroshi Kuboki, Kanagawa (JP); Shinji Usuba, Tokyo (JP)

(73) Assignee: Oki Electric Industry Co., Ltd., Tokyo (JP)

(*) Notice: Subject to any disclaimer, the term of this patent is extended or adjusted under 35 U.S.C. 154(b) by 929 days.

(21) Appl. No.: 12/923,138

(22) Filed: Sep. 3, 2010

(65) Prior Publication Data

US 2011/0075823 A1   Mar. 31, 2011

(30) Foreign Application Priority Data

Sep. 28, 2009   (JP) .................. 2009-222664

(51) Int. Cl.
  *H04M 11/00*   (2006.01)
  *H04M 1/00*    (2006.01)
  *G06F 3/16*    (2006.01)

(52) U.S. Cl.
  CPC ..................... *G06F 3/162* (2013.01)

(58) Field of Classification Search
  CPC combination set(s) only.
  See application file for complete search history.

(56) References Cited

U.S. PATENT DOCUMENTS

| | | | |
|---|---|---|---|
| 6,118,780 A * | 9/2000 | Dunn et al. | 370/355 |
| 6,215,784 B1 * | 4/2001 | Petras et al. | 370/356 |
| 6,253,249 B1 * | 6/2001 | Belzile | 709/249 |
| 6,337,858 B1 * | 1/2002 | Petty et al. | 370/356 |
| 6,345,047 B1 * | 2/2002 | Regnier | 370/352 |
| 6,377,569 B1 * | 4/2002 | Tsujigawa et al. | 370/352 |
| 6,424,647 B1 * | 7/2002 | Ng et al. | 370/352 |
| 6,438,124 B1 * | 8/2002 | Wilkes et al. | 370/352 |
| 6,621,893 B2 * | 9/2003 | Elzur | 379/93.05 |
| 7,567,549 B2 | 7/2009 | Adan et al. | |
| 2004/0218583 A1 * | 11/2004 | Adan et al. | 370/352 |
| 2007/0025338 A1 * | 2/2007 | Benditovich et al. | 370/352 |

* cited by examiner

Primary Examiner — Joseph T Phan
(74) Attorney, Agent, or Firm — Rabin & Berdo, P.C.

(57) ABSTRACT

A voice communication arrangement having a voice communication program installed in a computer loaded with a versatile OS thereon includes a voice data input/output function for passing through the OS voice data produced from voice sound captured by a microphone of the arrangement or received from another voice communication device, when connected to the arrangement, without being processed by the OS as audio data.

2 Claims, 4 Drawing Sheets

VOICE COMMUNICATION ARRANGEMENT FOR MINIMIZING COMMUNICATION DELAY CAUSED BY AUDIO SIGNAL PROCESSING IN OS

BACKGROUND OF THE INVENTION

1. Field of the Invention

The present invention relates to a voice communication arrangement for causing a computer such as a personal computer commercially available to function as a telephone terminal, or a softphone.

2. Description of the Background Art

In recent years, personal computers having an application for softphone loaded thereon have been used as telephone terminals. For example, a personal computer having a connector, such as a USB (Universal Serial Bus) interface, connectable to an external device is connected through the connector to an external voice input/output device, such as a headset or a handset, comprising a microphone and a loudspeaker, by means of which an operator or user may be on the phone. Further, for example, an audio device dedicated to audio signals may be used as the above-described external voice input/output device to enjoy voice communication of high sound quality.

Forwarding and receiving of voice signals between a personal computer and an external voice input/output device have conventionally been taken place by means of a general of standard audio interface mounted on an OS (Operating System) of the personal computer due to the following two factors.

First, since most of personal computers available on the market have a built-in sound device mounted thereon, which is adapted to analog input/output, and have a preinstalled driver dedicated to the OS installed in the computers, they have been used by many of users. Some of users giving weight to sound quality have separately used an external voice input/output device, such as a USB headset. However, they have still used the standard mechanism of the OS including drivers and PnP (Plug and Play) functions as they are, with the result that voice signals are input and output on the same audio route as the built-in device.

Second, in order to accomplish sound volume control, sound file playback for generating audible sound and a mixing function as well as to cooperate with other applications, API (Application Programming Interface) has been used.

In U.S. Pat. No. 7,567,549 to Adan, et al., there is proposed a computer telephony interface adaptor, which can be connected between a telephone network and a personal computer having a headset or the like connected thereto to process voice signals, thereby reducing processing work on the personal computer and delay in the processing.

However, use of the voice input/output interface and drivers generally included in the OS is based on the premises of compatibility with other applications, such as reproduction of music, thus causing, thanks to the versatility expanding, the processing to be dealt with many of those software applications, which possibly cause excessive overhead, thus ultimately resulting in delay. In order to overcome the problem described above, there has been an interface designed with delay partially taken into account, for example, ASIO (Audio Streaming Input Output). Such an interface is specialized for reproduction and play of music and not effectively applicable to both-way real-time communications.

Generally, the newer version of an OS remarkably tends to exhibit more excessive overhead so as to cause more serious delay than before, notwithstanding the performance of hardware including personal computers being substantially improved.

The delay may be raised by a variety of causes. For example, when an application starts up with plural applications simultaneously active so as to render the delay suddenly increase due to the processing on the background, the delay often has a negative effect for example on the operation of an echo canceller and the like.

Such a variety of problems described above has become a significant bottleneck to developing voice communication services, thus rendering the range of applications of softphones limited.

Adan, et al., intends to achieve reduced delay whereas requiring an adaptor dedicated therefor, and thus, it can hardly be said that it is a solution applicable to a variety of users.

SUMMARY OF THE INVENTION

It is therefore an object of the present invention to provide a voice communication arrangement capable of reducing delay in processing voice signals regardless of intermediation of an OS.

In accordance with the invention, a voice communication arrangement having a voice communication program installed in a computer loaded with an operating system including a voice data processing feature comprises a first audio device detachably connectable to the computer and including a microphone for catching a voice of a near-end talker to produce corresponding voice data and a loudspeaker for producing as an audible sound a voice of a far-end talker from voice data transmitted from a voice communication device when connected to the computer, and the voice communication program comprises a first voice data input/output function operative in response to the first audio device being connected to the computer for causing the voice data received from or to be transmitted to the voice communication device to pass the operating system, without intermediation of the voice data processing feature, to forward or receive the voice data to or from the first audio device.

In accordance with the invention, a voice communication program for functioning, when installed in a computer, a voice communication arrangement, in which the computer has an operating system loaded thereon and including a voice data processing feature, the computer having a first audio device detachably connectable to the computer, the first audio device comprising a microphone for catching a voice of a near-end talker to produce corresponding voice data and a loudspeaker for producing as an audible sound a voice of a far-end talker from voice data transmitted from a voice communication device when connected to the computer, causes the computer to serve as a first voice data input/output function operative in response to the first audio device being connected to the computer for causing the voice data received from the voice communication device to pass the operating system, without intermediation of the voice data processing feature, to forward or receive the voice data to or from the first audio device.

In accordance with a voice communication arrangement of the present invention, delay in processing voice signals can be minimized even when an OS is intervened in forwarding and receiving voice data to and from an external audio device detachably connected, thus attaining high sound quality.

The inventive concept disclosed in the application may also be defined in ways other than in the claims presented below. The inventive concept may consist of several separate inventions particularly if the invention is considered in light of explicit or implicit subtasks or from the point of view of advantages achieved. In such a case, some of the attributes included in the claims may be superfluous from the point of view of separate inventive concepts. Within the framework of the basic inventive concept, features of different embodiments are applicable in connection with other embodiments.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENTS

With reference to the accompanying drawings, preferred embodiments of a voice communication arrangement according to the invention will be described in detail when applied to a personal computer commercially available to implement a telephone terminal, such as a softphone.

Figure 1:
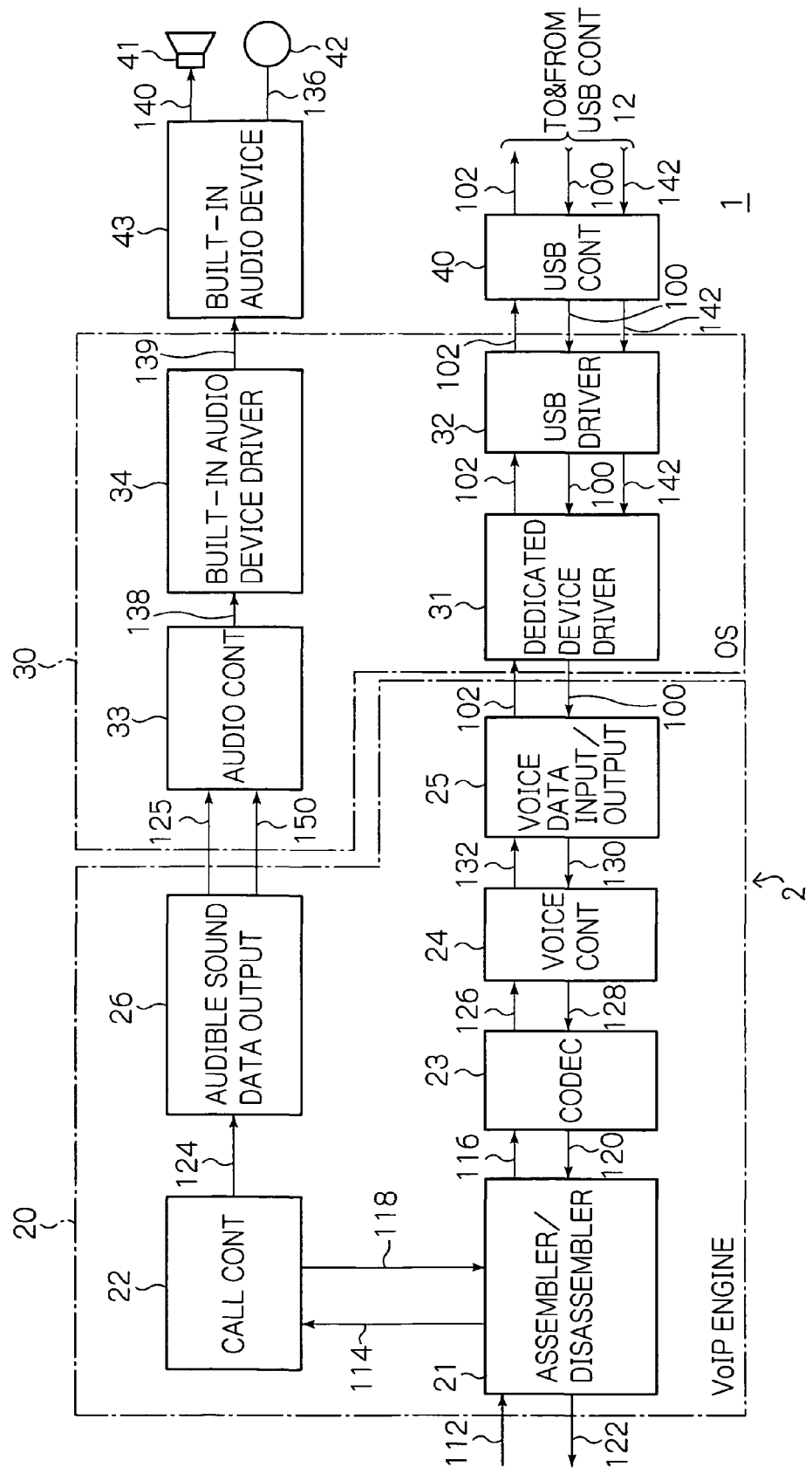
FIG. 1 is a schematic block diagram showing the functional configuration of a personal computer in a voice communication arrangement of a preferred embodiment of the present invention.
Figure 2:
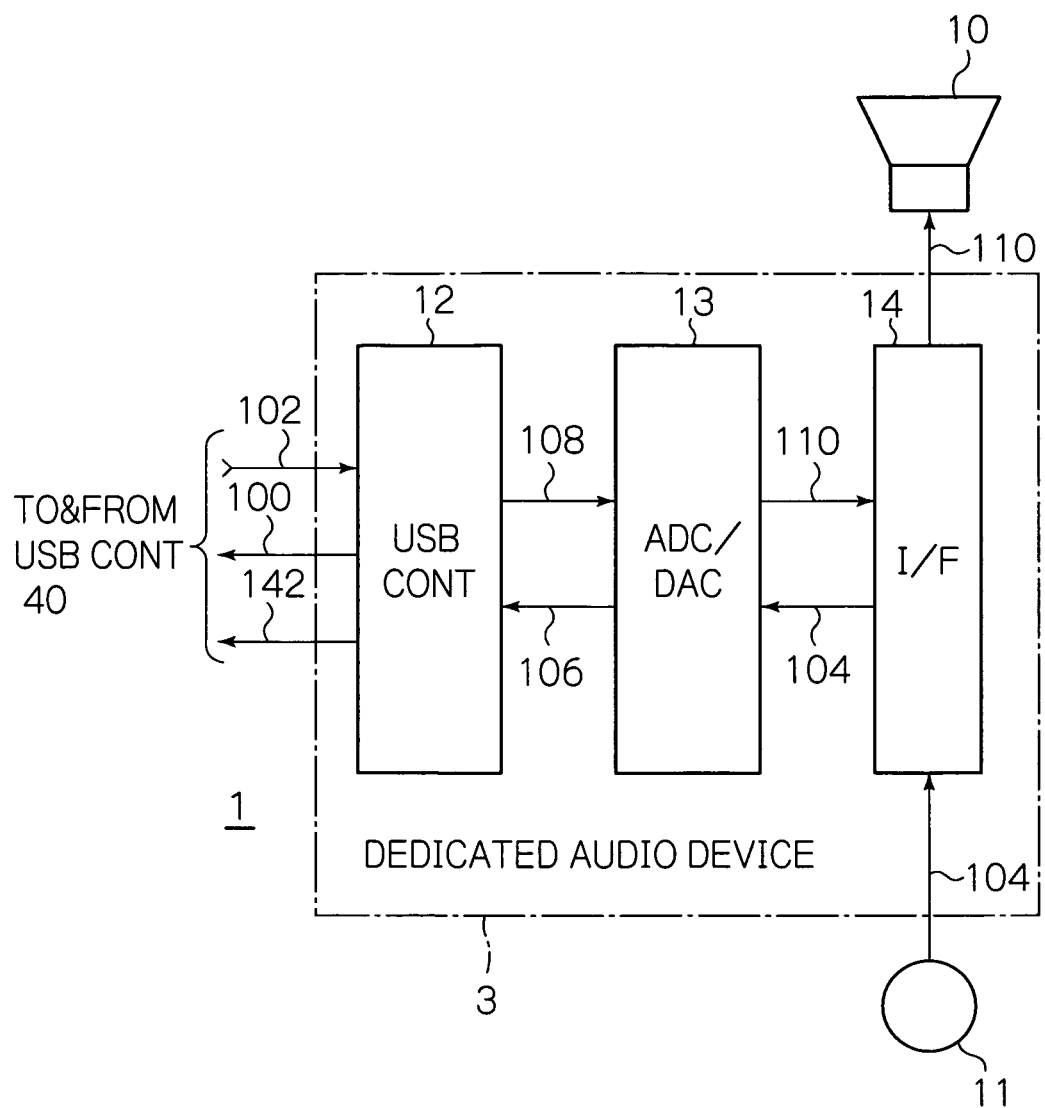
FIG. 2 is a schematic block diagram showing the functional configuration of a dedicated USB audio device in the voice communication arrangement of the preferred embodiment.

FIGS. 1 and 2 are schematic block diagrams showing the functional configuration of a voice communication arrangement or system 1 in accordance with a preferred embodiment. In the figures, the voice communication arrangement 1 generally comprises a personal computer 2 and a dedicated USB (Universal Serial Bus) audio device 3 detachably connected to the personal computer 2. Like components are designated with the same reference numerals.

The dedicated USB audio device 3, FIG. 2, in this embodiment includes a USB interface having a voice (and audio) signal input/output function, and may comprise a loudspeaker 10 and a microphone 11 which may be built therein or detachably, i.e. externally, connected thereto.

The dedicated USB audio device 3 is adapted to send and receive voice data 100 and 102 to and from the personal computer 2. Particularly with the embodiment, the data are not processed as audio data by the OS (Operating System) 30 installed in the personal computer 2. In other words, the OS 30 is blind to the sort of data being audio or voice.

Therefore, the dedicated USB audio device 3, as compared to a common audio device currently available on the market, such as an audio device employing AC97CODEC, HD-Audio or the like, may be different in function in that forwarding and receiving of voice data 100 and 102 to and from the personal computer 2 are performed by the OS 30 in a mode of being unconscious of the fact that the data 100 and 102 are voice data. Namely, the dedicated USB audio device 3 may forward and receive voice data to and from the personal computer 2 in the same mode as data that are digitally processed by the personal computer 2 and transferred to and from a USB memory when connected to the computer 2.

The dedicated USB audio device 3 comprises a USB controller, or USB interface (I/F) device, 12 for controlling and executing data transfer to and reception from the personal computer 2, an analog-to-digital and digital-to-analog converter (ADC/DAC) 13 for converting analog voice signals 104 caught by the microphone 11 to corresponding digital voice data 106 as well as converting digital voice data 102 given from the personal computer 2 to corresponding analog voice signals 110, and an interface (I/F) 14 for establishing connection to the loudspeaker 10 and the microphone 11.

The USB controller 12 may be adapted to transfer voice data 100 in such a form that the OS 30 is unconscious of the fact that the data 100 are audio data.

As will be described later, as the dedicated USB audio device 3, a common USB audio device, such as an audio device employing AC97CODEC, HD-Audio or the like as stated above may be employed. Such a common USB audio device may be recognized as the dedicated USB audio device 3 by means of recognition procedure of the OS 30 so that the voice data 100 and 102 transferred from and to the audio device 3 will not be processed by the OS 30 as audio data.

Returning to FIG. 1, the personal computer 2 may comprise a VoIP (Voice over Internet Protocol) engine 20, the OS 30, a USB controller, or USB I/F device, 40, a built-in loudspeaker 41, a built-in microphone 42 and a built-in ADC/DAC, or built-in audio device, 43 as components related to telephone communication. In the description, the VoIP engine 20 and the OS 30, of which the substance is constituted of software, will be referred to as a VoIP engine and an OS, respectively, which cover the possibility of hardware, such as a CPU (Central Processor Unit), for executing the software.

The VoIP engine 20 mainly comprises an assembler/disassembler 21, a call controller 22, a coder/decoder, or codec, 23, an audio controller 24, a voice data input/output (I/O) function 25 and an audible sound data output function 26.

The assembler/disassembler 21 is adapted to disassemble a packet 112 received by a communication section, not shown, from a telephone network. Thus, signals or data are designated with reference numerals of connections on which they are conveyed. When the received packet 112 is a call control packet, the assembler/disassembler 21 disassembles the packet 112 to obtain control data 114 and provides them to the call controller 22. When the received packet 112 is a voice packet, the packet assembler/disassembler 21 disassembles the packet 112 to obtain coded voice data 116 and provides them to the coder/decoder 23.

Further, the assembler/disassembler 21 is adapted to assemble a packet 122 including call control data 118 from the call controller 22 and/or a coded voice data 120 from the coder/decoder 23 to transmit the packet 122 to the telephone network from the communication section.

The call controller 22 is adapted to execute call control, such as establishment of a speech path when a call is originated or terminated and disconnection of a speech path when a call is released. In addition, the call controller 2 is arranged to be given through the OS 30 a key touch signal or the like generated by a keyboard, not shown, when manipulated by the user.

The call controller 22, when necessary to generate a tonal output of a predetermined audible tone or sound, such as ring tone and ringing signal, in some predominant stages of the call control, takes out the audible sound data 124 stored therein and provides them to the audible sound data output function or section 26. In the context, the term "section" may be referred to part of software and sometimes to hardware implementing the function defined by the software.

The coder/decoder 23 is adapted to receive and decode the coded voice data 116 to produce and send decoded voice data 126 to the voice data input/output function or section 25 via the voice controller 24. Further, the coder/decoder 23 is adapted to receive and encode voice data 128 from the voice data input/output function 25 via the voice controller 24 to produce and transfer the coded voice data 120 to the assembler/disassembler 21.

The voice controller 24 is provided inside the VoIP engine 20 since this illustrative embodiment is structured to allow voice data 126 from the coder/decoder 23 and voice data 100 from the audio device 3 to bypass an audio controller 33 in the OS 30. The audio controller 24 is adapted to process voice data for volume control, sound file playback or media play, audio recording, mixing and the like. The voice controller 24 in this embodiment processes the received voice data 126 from the coder/decoder 23 to produce output voice data 132, and produces the transmitting voice data 128 from voice data 130 fed from the voice data input/output function 25.

The voice data input/output function 25 is adapted to transfer the voice data 132 to and receive the voice data 100 from the dedicated USB audio device 3 via the OS 30. In this embodiment, as described above, transfer and reception of the voice data 132 and 100 to and from the dedicated USB audio device 3 are performed in a mode of the USB audio device 3 being unconscious of the fact that the data are audio data, and thus, the voice data input/output function 25 processes the voice data 132 and 100 so that the input/output function 25 can forward and receive the data 132 and 100 in a fashion similar to the case of general digital data, such as alphanumeric data.

For example, between the voice data input/output function 25 and the USB controller 12 of the dedicated USB audio device 3, FIG. 2, voice data are forwarded and received to and from each other in a form of USB packet having voice data, such as PCM (Pulse Code Modulation) voice data, contained therein so as to make the OS 30 unaware of the fact that the voice data are audio data.

The audible sound data output function 26, FIG. 1, is adapted to receive the audible sound data 124 from the call controller 22 and produce from the data 124 audible sound data 125 in a form compatible with the standard or general interface of the OS 30 to provide the data 125 to the OS 30.

The USB controller 40 is adapted to transfer, when interconnected to the mating USB controller 12 of the dedicated USB audio device 3, data 100 and 102 on the USB.

The built-in loudspeaker 41 and microphone 42 are mounted on the personal computer 2. In this embodiment, when the personal computer 2 acts as a telephone terminal, the loudspeaker 41 and microphone 42 may simply play a function of certain level, such as production of audible tone or signal from the audible sound data 125.

The built-in ADC/DAC 43 is adapted to convert analog voice signals 136 captured by the built-in microphone 41 to corresponding digital voice data as well as convert digital voice data 139 given from the OS 30 to corresponding analog voice signals 140 to transfer and receive signals to the built-in loudspeaker 41 and from and the built-in microphone 42.

The OS 30 may be, for example, an existing general-purpose, or versatile, OS such as Windows, Linux, Mac OS, (Trademarks) etc. So far as the function of telephone terminal such as softphone, the OS 30 may comprise a dedicated device driver 31, a USB driver 32, an audio controller 33 and a built-in audio device driver, or built-in ADC/DAC driver, 34.

The dedicated device driver 31 and the USB driver 32 may be involved in forwarding and receiving of voice data 102 and 100, while the audio controller 33 and the built-in device driver 34 may be involved in operation of emanating audible sound produced from the audible sound data 125.

The dedicated device driver 31 is dedicated to rendering the dedicated USB audio device 3, when connected, function as a dedicated audio interface of the dedicated USB audio device 3 performing transmission and reception of data 102 and 100, rather than a standard or general audio interface, like the audio controller 33.

Specifically, the dedicated device driver 31 executes, together with the USB driver 32, transparent transfer of the voice data 102 and 100 between the VoIP engine 20 and the dedicated USB audio device 3. In other words, the dedicated device driver 31 allows the transfer data 100 and 102, e.g. in the form of USB packets having voice data included therein in this embodiment, to be transferred between the VoIP engine 20 and the dedicated USB audio device 3 without being processed as audio data.

The dedicated device driver 31 may implement a function equivalent to that of a driver for a USB audio device, such as "usbaudio.sys" in case of Windows (trade name), whereas it does not execute any processes other than such data transfer, i.e. audio processes such as volume control, sound file playback, audio recording, mixing and the like are not dealt with. In other words, the dedicated device driver 31 in this embodiment may be adapted to execute only data transmission process.

The USB driver 32 is adapted to drive data transfer, i.e. USB transfer in this embodiment, between the USB controller 40 and the USB controller 12, FIG. 2, of the dedicated USB audio device 3. Further, the USB driver 32 is adapted to recognize that the dedicated USB audio device 3 is inserted in a USB connector, not specifically shown, of the personal computer 2.

In order to allow a commercially available USB audio device to be recognized as the dedicated USB audio device 3, rather than a general audio device, it may be preferable to rewrite beforehand its manufacturer-supplied device information necessary for the commercially available USB driver to activate its PnP (Plug and Play) function, such as "inf" file in case of Windows (trade name), with the information, e.g. ID (IDentification), such as vender or product ID, of the dedicated USB audio device 3.

In such a case, the dedicated driver 31 may be enabled when the device 3 is connected to the personal computer 2 via its USB connector and the USB driver 32 receives ID information 142 from the dedicated USB audio device 3 to recognize the ID of the interconnected device 3 being ID of the dedicated USB audio device 3.

Applying the above-described solution makes it possible for a versatile USB audio device to be recognized and started up without being subject to special modification, remodeling or the like.

The audio controller 33, which may be a general or standard audio controller the OS 30 has, is adapted to process the audible sound data 125, such as volume control, sound file playback, recording, mixing and the like, to produce processed sound data 138.

The built-in device driver 34 drives the built-in ADC/DAC 43 for the built-in loudspeaker 41 and microphone 42.

In operation, when the voice communication arrangement 1 establishes a call connection upon a call being originated therefrom or terminated thereon, the call controller 22 executes a sequence of establishing the call.

At either of stages of the call control, when it becomes necessary to produce a tonal output of audible sound, the call controller 22, FIG. 1, sends appropriate audible sound data 124 to the audible sound data output function 26. In response, the audible sound data output function 26 sends the audible sound data 125 to the OS 30, together with information 150 representing that the audible sound data 124 is audio data.

In the OS 30, in turn, the audible sound data 125 are processed by the audio controller 33 and the built-in device driver 34, which are general interfaces for audio and voice data, and thereafter, the processed audible sound data 139 are passed to the built-in ADC/DAC 43, in which they are converted to corresponding analog signals 140, which are reproduced by the built-in loudspeaker 41 in the form of audible sound.

As described above, at the call connection control stage, audible sound or tone that is scarcely problematic in terms of delay is thus dealt with the general interface of the OS 30.

When a call connection is established to a called or calling party under the call control of the call controller 22, the users on both devices, i.e. far-end and near-end users, will start telephone conversation. Of course, the near-end user may be of the voice communication arrangement 1.

A voice packet 112 conveying voice information of a far-end talker from a call-connected telephone device, not shown, is received by the assembler/disassembler 21, where it is disassembled and the coded voice data 116 are taken out. The coded voice data 116 are then decoded by the coder/decoder 23 into the voice data 126. The voice data 126, after being subject to processing, such as volume control and the like by the voice controller 24, are converted by the voice data input/output function 25 to transfer data 102 in a form capable of passing through, or blind to, the OS 30 as they are and will then be sent to the OS 30. Such a form may be, for example, a USB packet.

In the OS 30, the dedicated device driver 31 and the USB driver 32 permit the transfer data 102 thus provided to pass therethrough as they are, and in turn sent from the USB controller 40 to the USB controller 12 of the dedicated USB audio device 3.

The USB controller 12, FIG. 2, disassembles the transfer form, e.g. a USB packet or packets in this embodiment, of the voice data 102 and restores voice data 108 therefrom. The voice data 108 are converted by the ADC/DAC 13 to corresponding analog voice signals 110, which are then sent via the interface 14 to the loudspeaker 10, where they will be reproduced in the form of audible sound.

When the near-end user talks on the microphone 11, the voice is caught by the microphone 11 to be transduced into a voice signal 104, which is sent through the interface 14 to the ADC/DAC 13, where the voice signal is converted to corresponding digital signals 106. In the USB controller 12, the voice data 104 are converted into transfer data 100, namely, assembled in a form of USB packet or packets capable of passing through the OS 30 as they are. The USB packets are then sent to the personal computer 2 together with ID information 142 of the device 3.

In the personal computer 2, FIG. 1, the transfer data 100 are received by the USB controller 40. However, since the transfer data 100 are recognized by the USB driver 32 as data from the dedicated USB audio device 3 by means of its ID information 142, the transfer data 100 will be given to the USB driver 32 under the control of the dedicated device driver 31 and the USB driver 32 without disassembling the transfer form thereof, i.e. USB packets with the instant illustrative embodiment. The transfer data 100 are passed through the USB driver 32 and the dedicated device driver 31 as they are, and given to the voice data input/output function 25.

In the voice data input/output function 25, the transfer form of the transfer data 100 is released, i.e. the USB packet or packets are disassembled, to thereby restore the voice data 130, which will then be transferred to the voice controller 24. In the voice controller 24, the voice data 130 are subjected to necessary voice processing to be output as the voice data 128, which are then sent to the coder/decoder 23, even when the voice data 128 have not been substantially processed. The processed voice data 128 are encoded by the coder/decoder 23 into the coded data 120, which are assembled by the assembler/disassembler 21 into a packet or packets 122, which will be transmitted to the telephone network.

In summary, according to the instant embodiment, a dedicated transmitter/receiver interface, particularly logics, is prepared to provide a dedicated route for passing only voice data requiring stricter real-time transmission, while a general-purpose interface is used for media processing, such as processing of audible tone, with the use of an audio device provided as standard for an OS. As the result, delay of voice data otherwise caused by audio processing by an OS can be minimized because the data are not passed through a voice processing route, or feature, of the OS.

Further, since voice data can pass IP networks, it is possible for the illustrative embodiment to transmit and receive broadband voice data. If the OS is not compatible in voice data processing with a broadband application, then high sound quality could not be accomplished. According to the instant embodiment, however, since voice data are simply passed through the OS as they are, and also the external, or detachable, dedicated USB audio device 3 is applied, it is possible to accomplish high sound quality.

Specifically, according to the present embodiment, it is possible to achieve both-way transmission and reception of media streams, upon which the VoIP system relies, with high sound quality almost in real time.

Figure 3:
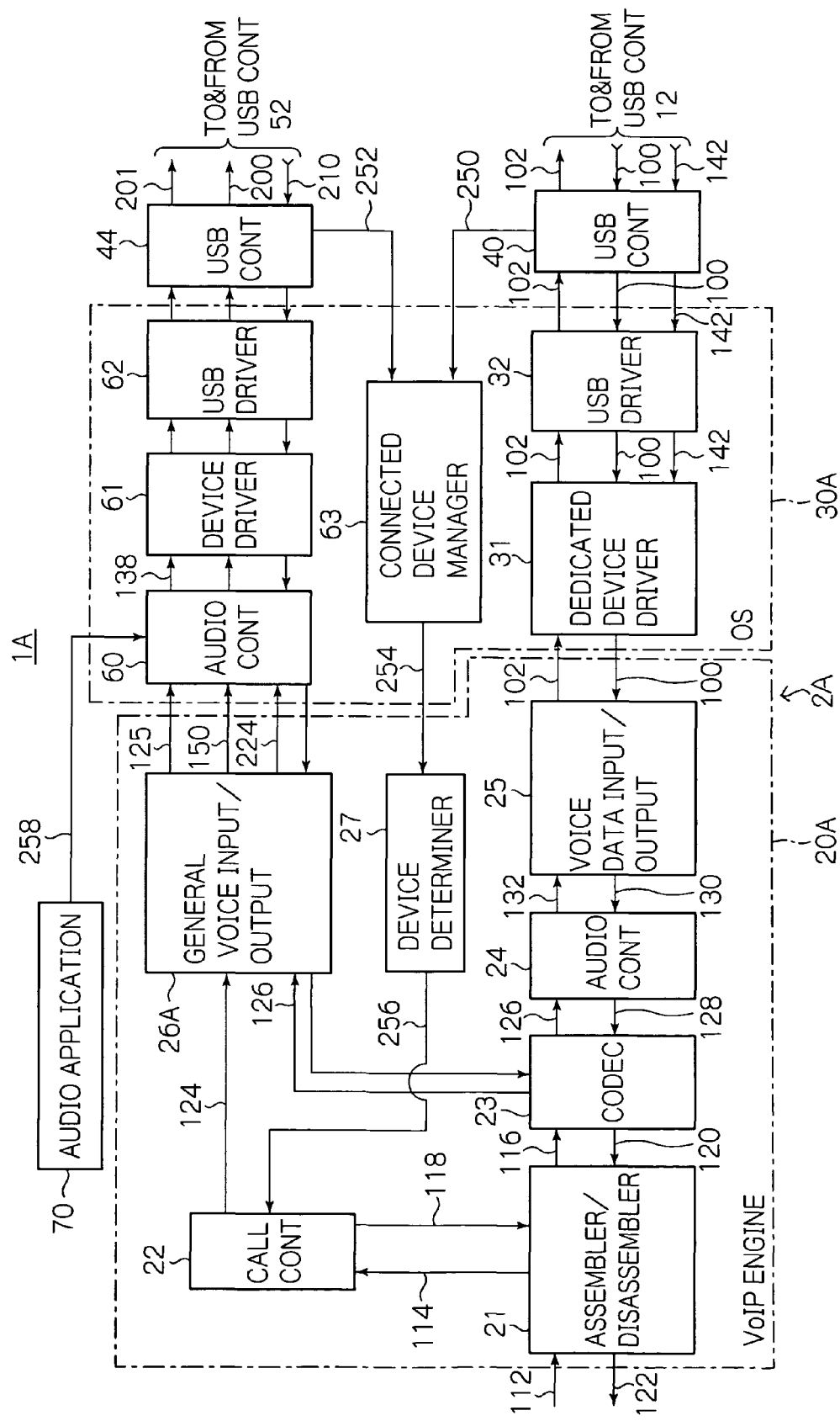
FIG. 3 is a schematic block diagram, like FIG. 1, showing the functional configuration of a personal computer in a voice communication arrangement of an alternative preferred embodiment of the present invention.

Next, an alternative preferred embodiment will be described in detail with reference further to FIGS. 3 and 4, in which a voice communication arrangement 1A in accordance with the invention are also applied to a commercially available personal computer 2A so as to serve as a softphone terminal. FIG. 3 is a schematic block diagram showing the functional configuration of the personal computer 1A applied to the voice communication arrangement 1A. Like components are designated with the same reference numerals.

Figure 4:
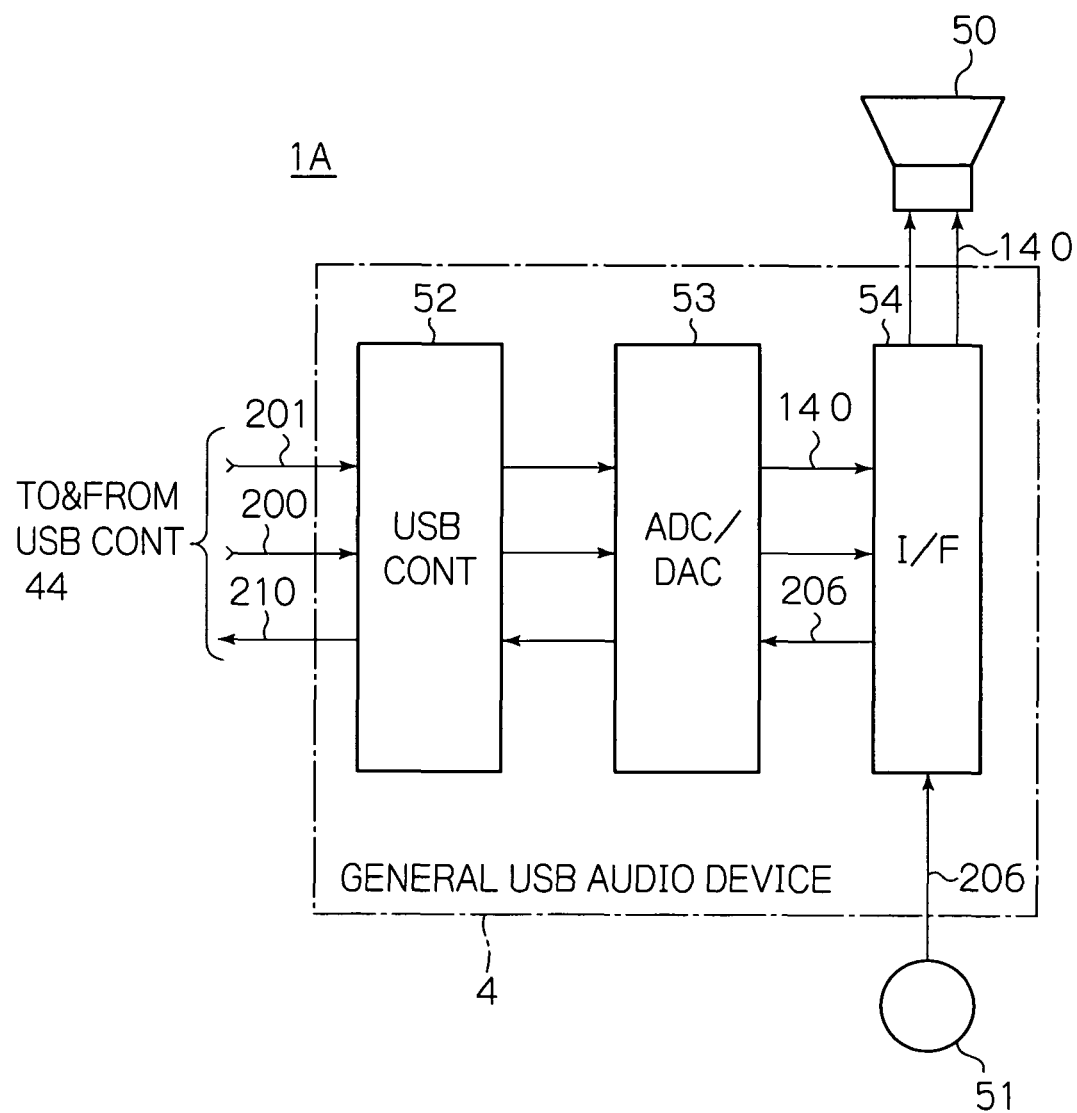
FIG. 4 is a schematic block diagram, like FIG. 2, showing the functional configuration of a general USB audio device in the voice communication arrangement of the alternative preferred embodiment.

In FIG. 3, the personal computer 2A applied to the voice communication arrangement 1A comprises a plurality of, e.g. two, USB connectors, to which the dedicated USB audio device 3, FIG. 2, and a general or standard USB audio device 4, FIG. 4, can be connected. In the following, from the viewpoint of emphasizing the characteristic features of the dedicated USB audio device 3, when applied to the voice communication arrangement 1A of the alternative embodiment, the dedicated USB audio device 3 will hereinafter be referred to as a reduced-delay USB audio device, but its substance may be the same. FIG. 3 shows the personal computer 1A having the reduced-delay USB audio device 3 and the general USB audio device 4 connected.

The general USB audio device 4 may be an existing common USB audio device. The reduced-delay USB audio device 3 and the general USB audio device 4 are different from each other in constituent elements of the OS 30A which will process the data transferred to and from the devices 3 and 4. As shown in FIG. 4, the general USB audio device 4 has a loudspeaker 50 and a microphone 51 interconnected thereto as well as comprises a USB controller, or USB I/F device, 52, an ADC/DAC 53 and an I/F 54, which are interconnected as depicted.

The USB audio device 4 in this alternative embodiment is adapted to receive from the personal computer 2A a voice signal 200 representing voice information 112 of a far-end talker in addition to an audio signal 201 representing the audible sound data 124. The USB audio device 4 is further adapted to receive an analog voice signal 206 of a near-end talker and produce a digital voice signal 210 to supply the latter to the personal computer 2A.

In use, the USB controller 12 of the reduced-delay USB audio device 3, FIG. 2, is connected to the USB controller 40, FIG. 3, of the personal computer 2A while the USB controller 52 of the general USB audio device 4, FIG. 4, is connected to a USB controller, or a USB I/F device, 44 of the personal computer 2A.

Note that the personal computer 2A may include the built-in loudspeaker 41, the built-in microphone 42 and the built-in ADC/DAC 43, which are however omitted from FIG. 3 merely for avoiding complexity.

In the personal computer 2A shown in FIG. 3, the OS 30A may comprise, in addition to the dedicated device driver 31 and the USB driver 32 shown in FIG. 1, an audio controller 60, a device driver, or USB-audio driver, 61 and a USB driver 62 that may be rendered active when transferring voice and audio data from and to the general USB audio device 4. The audio controller 60 is may be same as the audio controller 33 shown in FIG. 1.

The OS 30A further comprises a connected device manager 63. The connected device manager 63 in this embodiment is adapted for receiving connecting information 250 and 252 from the USB controllers 40 and 44, respectively, to manage what type of USE device is connected to which one of the USE connectors. Of course, the manager 63 may receive connecting information 250 and 252 from other components such as the drivers 32 and 62.

The personal computer 2A may include a VoIP engine 20A as shown in FIG. 3. The VoIP engine 20A comprises a general voice input/output function 26A and a device determiner 27 in addition to the assembler/disassembler 21, the call controller 22, the coder/decoder 23, the voice controller 24, the voice data input/output function 25.

The general voice data input/output function 26A is provided in place of the audible sound data output function 26 included in the embodiment shown in FIG. 1 and is adapted to transmit and receive voice data, including audible sound data 124, to and from a processing system, constituted of the audio controller 60, the device driver 61 and the USB driver 62, in the OS 30A. In other words, the general voice data input/output function 26A may be enabled when the general USB audio device 4 is connected to the personal computer 2A.

The device determiner 27 is adapted to determine which audio device 3 or 4 to be used based on management information 254 provided from the connected device manager 63 in the OS 30A. In the instant alternative embodiment, the determiner 27 sends resultant information 256 to the call controller 22 so as to control data flow in the personal computer 2A.

Specifically, when audible tonal sound has to be produced in the call control stage of establishing or disconnecting a call connection, the device determiner 27 decides to select the general USB audio device 4 to be used if the general USB audio device 4 is connected while the determiner 27 selects the built-in loudspeaker 41 to be used if the general USB audio device 4 is not connected.

During a telephone call connection established, the device determiner 27 selects the reduced-delay USB audio device 3 to be used as a voice input/output device if the reduced-delay USB audio device 3 is connected, regardless of whether or not the general USB audio device 4 is connected.

Otherwise, during a telephone call connection established, the device determiner 27 selects the general USB audio device 4 to be used as a voice input/output device if the reduced-delay USB audio device 3 is not connected but the general USB audio device 4 is connected.

During a telephone call connection established, when neither the reduced-delay USB audio device 3 nor the general USB audio device 4 is connected, the device determiner 27 selects the built-in loudspeaker 41 and the built-in microphone 42 to be used as a voice input/output device for the call connection.

When the reduced-delay USB audio device 3 is used as a speech sound input/output device, the device determiner 27 causes the processing system, constituted of the assembler/disassembler 21, the coder/decoder 23, the voice controller 24 and the voice data input/output function 25, to be active. When the general USB audio device 4 is used as a voice input/output device, the determiner 27 causes the processing system, constituted of the assembler/disassembler 21, the coder/decoder 23 and the general voice data input/output function 26A, to actively function.

Now, when the general USB audio device 4 is connected, if an audio application 70, such as software for playing background music, other than the VoIP engine 20A is in operation, then the general USB audio device 4 is used for audio data 258 from the application 70. In such a case, when the general USB audio device 4 is not used as a speech sound input/output device, the audio data 258 from the audio application 70 are delivered from the general USB audio device 4 to be generated as audible sound. When the general USB audio device 4 is used as a speech sound input/output device, the audio controller 60 synthesizes the data 254 from the audio application 70 with the voice data 224 from the general voice data input/output function 26A to deliver the resultant data to the general USB audio device 4 to produce corresponding audible sound.

To execute these processes, when the device determiner 27 transmits or receives voice data to or from the OS 30A, the determiner 27 selects an appropriate API (Application Program Interface), or system call in case of Linux (trade name), of the OS 30A in conformity to specific devices currently opened. Specifically, when controlling the general USB audio device 4, the determiner 27 may select an API for transmitting and receiving PCM (Pulse Code Modulation) signals to use the general voice data input/output function 26A, while selecting a USB control AIP to use the voice data input/output function 25 when controlling the USB device 3.

Thus, the alternative embodiment shown in FIG. 3, when using the reduced-delay USB audio device 3 as a speech sound input/output device, can accomplish the advantages similar to those of the embodiment shown in FIG. 1.

Further, in accordance with the alternative embodiment, speech sound signals can be transmitted and received in the most appropriate form in dependence upon how and which external devices are connected. Still further, in accordance with the alternative embodiment, it is possible to use the VoIP engine in combination with another audio application, such as 70.

The alternative embodiment shown in FIG. 3 is thus adapted to determine a device for use in inputting and outputting speech sound signals in dependence upon whether or not the reduced-delay USB audio device 3 and/or the general USB audio device 4 are connected. The system may be adapted to determine a device for use in inputting and outputting speech sound signals in response to a command from an application, such as an application higher in layer than the VoIP engine 20A, other than the VoIP engine 20A in addition to how the reduced-delay USB audio device 3 and/or the general USB audio device 4 are connected.

A further alternative embodiment may be provided in which the VoIP engine 20 or 20A has a list of USB audio devices usable for the VoIP engine 20A prepared beforehand. In the instant embodiment, when an audio device which is not included in the list is connected to the personal computer 2 or 2A, the computer may process audio data as if the unlisted audio device were not connected thereto.

The respective preferred embodiments described above are adapted to use no audio controller that the OS has but a voice controller included in the VoIP engine for compensating for such an audio controller. Such compensation may be taken place with another solution. For example, when the dedicated or reduced-delay USB audio device 3 comprises a sound volume control function, a command for controlling sound volume may be issued from the VoIP engine to the dedicated or reduced-delay USB audio device 3 so as to control sound volume.

Further, in the respective preferred embodiments described above, the dedicated or reduced-delay USE audio device 3 cannot be used as a general USB audio device such as 3. Use may be made of a USB audio device which is usable as both the dedicated or reduced-delay USB audio device 3 and the general USB audio device 4. For example, a single USB audio device may be provided with plural, e.g. two, pieces of ID information so as to enable the user to manipulate its setting switch to selectively set the single USE audio device to function as either of the dedicated or reduced-delay USB audio device 3 and the general USB audio device 4.

Still further, in the respective preferred embodiments described above, the dedicated device driver 31 transparently transmits and receives transfer data. Use may be made of the dedicated or reduced-delay USB audio device 3 adapted to render its optional function effective at the time of being connected to the USB connector of a personal computer. For example, user information may be stored beforehand in the dedicated or reduced-delay USB audio device 3 under the control of the VoIP engine 20, and the stored user information will be read out for user authentication when the dedicated or reduced-delay USB audio device 3 is connected.

The respective preferred embodiments described above use USB interfaces, the most popular general-purpose PC (Personal Computer) interface. Other general-purpose interfaces may be applied, such as FireWire (IEEE: Institute of Electrical and Electronic Engineers 1394), Bluetooth (trade name), PC card interfaces (PCMCIA, Personal Computer Memory Card International Association, and CardBus), and PCI (Peripheral Components Interconnect bus) interface.

Further, the respective preferred embodiments described above are directed to a personal computer as a computer, or information processor, having an OS installed. However, the invention is applicable to any forms of processor device as far as a versatile operating system or system control program can be installed. For example, the invention is applicable to not only general or popular personal computers but also so-called netbooks or mini notebooks and mobile personal computers. Also, for example, the invention is applicable to multimedia internet devices (MIDs) and ultra-mobile PCs (UMPCs).

The entire disclosure of Japanese patent application No. 2009-222664 filed on Sep. 28, 2009, including the specification, claims, accompanying drawings and abstract of the disclosure is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. A voice communication arrangement having a voice communication program installed in a computer loaded with an operating system including a voice data processing feature, said arrangement comprising a first audio device detachably connectable to said computer and including a microphone for catching a voice of a near-end talker to produce corresponding voice data and a loudspeaker for producing as an audible sound a voice of a far-end talker from voice data transmitted from a voice communication device when connected to said computer, said voice communication program comprising a first voice data input/output function to forward or receive the voice data of the near-end/far-end talker to or from the first audio device as audio data, the operating system having a device driver provided between said first voice data input/output function and the first audio device, when connected to the computer, without intermediation of the voice data processing feature, said device driver transparently transferring forwarded or received voice data when connected to the first audio device to the first audio device or said first voice input/output function;

said arrangement further comprising a second audio device detachably connectable to said computer and including a microphone for catching the voice of the near-end talker to produce corresponding voice data and a loudspeaker for producing as an audible sound the voice of the far-end talker from the voice data transmitted from the voice communication device connected to said computer, said voice communication program further comprising:

a second voice data input/output function operative in response to said second audio device being connected to said computer for forwarding or receiving the voice data, received from or to be transmitted to the voice communication device, to or from said second audio device through the voice data processing feature; and a selector for enabling, when forwarding or receiving the voice data, either one of said first voice data input/output function and said second voice data input/output function;

wherein said selector enables said first voice data input/output function when said first audio device is connected to said computer, and enables said second voice data input/output function when said first audio device is not connected but said second audio device is connected to said computer.

2. A non-transitory computer-readable medium on which stored is a voice communication program for functioning, when installed in a computer, a voice communication arrangement, the computer having an operating system loaded thereon and including a voice data processing feature, the computer having a first audio device detachably connectable to the computer, the first audio device comprising a microphone for catching a voice of a near-end talker to produce corresponding voice data and a loudspeaker for producing as an audible sound a voice of a far-end talker from voice data transmitted from a voice communication device when connected to said computer,
- wherein said program causes the computer to serve as a first voice data input/output function for forwarding or receiving the voice data received from the voice communication device, the voice data of the far-end talker, the voice data of the near-end talker, and the voice data from the operating system as audio data,
- the operating system having a device driver provided between said first voice data input/output function and the first audio device, when connected to the computer, without intermediation of the voice data processing feature, said device driver transparently transferring forwarded or received voice data when connected to the first audio device or said first voice data input/output function;
- wherein the computer has a second audio device detachably connectable to the computer, the second audio device including a microphone for catching the voice of the near-end talker to produce corresponding voice data and a loudspeaker for producing as an audible sound the voice of the far-end talker from the voice data transmitted from the voice communication device connected to the computer, said program causing the computer to serve as:
- a second voice data input/output function operative in response to the second audio device being connected to the computer for forwarding or receiving the voice data, received from or to be transmitted to the voice communication device, to or from the second audio device through the voice data processing feature; and
- a selector for enabling, when forwarding or receiving the voice data, either one of the first voice data input/output function and the second voice data input/output function;
- wherein said selector enables said first voice data input/output function when said first audio device is connected to said computer, and enables said second voice data input/output function when said first audio device is not connected but said second audio device is connected to said computer.

* * * * *